United States Patent
Jeon

(10) Patent No.: US 9,061,946 B2
(45) Date of Patent: Jun. 23, 2015

(54) PRODUCTION METHOD FOR A TRULY SPHERICAL CERAMIC BALL BY MEANS OF A ROTATIONAL METHOD, AND A DEVICE THEREFOR

(75) Inventor: Hyoung Tag Jeon, Wanju-gun (KR)

(73) Assignee: Biocera Co., Ltd, Seongnam-si (KR)

( * ) Notice: Subject to any disclaimer, the term of this patent is extended or adjusted under 35 U.S.C. 154(b) by 148 days.

(21) Appl. No.: 13/254,258

(22) PCT Filed: Jul. 15, 2010

(86) PCT No.: PCT/KR2010/004599
§ 371 (c)(1),
(2), (4) Date: Sep. 1, 2011

(87) PCT Pub. No.: WO2011/008031
PCT Pub. Date: Jan. 20, 2011

(65) Prior Publication Data
US 2012/0098170 A1   Apr. 26, 2012

(30) Foreign Application Priority Data
Jul. 16, 2009   (KR) .................. 10-2009-0065041

(51) Int. Cl.
  B29C 67/24   (2006.01)
  C04B 35/64   (2006.01)
  C04B 35/626   (2006.01)

(52) U.S. Cl.
  CPC ........... *C04B 35/64* (2013.01); *C04B 2235/602* (2013.01); *C04B 2235/94* (2013.01); *C04B 35/62635* (2013.01); *C04B 2235/3232* (2013.01); *C04B 2235/96* (2013.01); *C04B 2235/963* (2013.01)

(58) Field of Classification Search
USPC ...................... 425/222; 264/117; 118/19, 308
See application file for complete search history.

(56) References Cited

U.S. PATENT DOCUMENTS

| | | | | | |
|---|---|---|---|---|---|
| 4,108,932 | A | * | 8/1978 | Takewell et al. | 264/117 |
| 5,182,119 | A | * | 1/1993 | Edens | 425/222 |
| 5,601,873 | A | * | 2/1997 | Nakazawa et al. | 118/19 |
| 5,868,982 | A | * | 2/1999 | Strait et al. | 264/117 |
| 6,142,095 | A | * | 11/2000 | Long | 118/19 |
| 6,508,591 | B2 | * | 1/2003 | Niwa et al. | 384/492 |

* cited by examiner

Primary Examiner — Joseph S Del Sole
Assistant Examiner — Thukhanh T Nguyen
(74) Attorney, Agent, or Firm — John K. Park; Park Law Firm

(57) ABSTRACT

The present invention relates to a production method for a truly spherical ceramic ball by means of a rotational method, and to a device therefor. More specifically, a method is disclosed which uses seeds to facilitate formation of ceramic balls into a spherical shape and repeats heating and cooling or grades ceramic balls according to size to form ceramic balls having a similar size during the formation process, thereby increasing strength of the ceramic balls while ensuring excellent particle size distribution. Also, an apparatus for producing ceramic balls using a rotation manner is disclosed.

12 Claims, 5 Drawing Sheets

PRODUCTION METHOD FOR A TRULY SPHERICAL CERAMIC BALL BY MEANS OF A ROTATIONAL METHOD, AND A DEVICE THEREFOR

TECHNICAL FIELD

The present invention relates to a method and apparatus for producing true-sphere type ceramic balls in a rotation manner. More particularly, the present invention relates to a method and apparatus for producing true-sphere type ceramic balls, which use seeds to facilitate formation of ceramic balls into a true-spherical shape and repeats heating and cooling or grades ceramic balls according to size to form ceramic balls having a similar size during the formation process, thereby increasing strength of the ceramic balls while ensuring excellent particle size distribution.

BACKGROUND ART

Ceramic is a generic term for non-metallic inorganic materials such as oxides, nitrides, carbides, etc., composed primarily of inorganic materials. Ceramics have excellent corrosion resistance, heat resistance, wear resistance, and the like, as compared with metal and organic materials, and are used in a variety of fields such as medical and health industry, chemistry, livestock industry, agriculture, fisheries, etc. Particularly, the ceramic material radiates far infrared light which is used for stabilizing and activating high molecular weight bio-structure through intensification of coupling of a water molecule to maintain freshness of food and accelerate a rate of chemical reaction such as fermentation. As such, ceramics are widely used in chemistry, livestock industry, agriculture, fisheries, and the like. In addition, ceramics have a porous structure which is known to have a function of adsorbing heavy metals and fungi in water through adsorption, absorption, and strain collection, and high hygroscopicity to provide functions of dehumidification, deodorization, anti-fungal activity, etc.

Ceramics are generally produced in the form of ceramic balls, which produce alkaline water having good and soft taste to drink, when used for water purification. Thus, the ceramic balls are used in a variety of fields for household, industry, agriculture and stockbreeding, such as water ionizers, filters for bidets, humidifiers, water purification and processing devices for washing, bathing, and the like, as well as water purifiers.

Various methods have been proposed to form ceramic powder into ceramic balls. For example, Korean Patent Laid-open Publication No. 1996-0012033 discloses spherical ceramic balls, which are formed using a compressing mould, Korean Patent Laid-open Publication No. 1996-0004277 discloses ceramic balls, which are formed by spraying a ceramic slurry in the form of droplets and sintering the droplets, and Korean Patent No. 153167 discloses spherical ceramic balls, which are formed by rotating/revolving a semi-sintered ceramic body in a rotary chamber composed of upper and lower halves.

However, these methods have problems in that it is difficult to form truly spherical ceramic balls, and there is a limit in achieving efficient production of a great quantity of ceramic balls within a short period of time.

DISCLOSURE

Technical Problem

One aspect of the present invention is to provide a method and apparatus for mass production of truly spherical ceramic balls by introducing ceramic powders and water and/or a binder into a rotary chamber and rotating the rotary chamber.

Another aspect of the present invention is to provide a method and apparatus for producing truly spherical ceramic balls with uniform particle size distribution, which solve a conventional problem in that, when ceramic powder is formed into ceramic balls from the beginning, the ceramic balls have a non-uniform particle size distribution, making it difficult to obtain ceramic balls having a desired particle size.

A further aspect of the present invention is to provide a method and apparatus for producing truly spherical ceramic balls, which may improve strength of the ceramic balls and prevent ceramic powder from adhering to an inner wall of the rotary chamber during a formation process.

Technical Solution

In accordance with one aspect of the present invention, a method of producing ceramic balls includes: (a) growing ceramic powder to balls having a desired size by rotating a rotary chamber while supplying materials including the ceramic powder, water and/or a binder into the rotary chamber; (b) drying the formed balls; and (c) sintering the dried balls at high temperature.

Seeds for adherence of the ceramic powder may be supplied into the rotary chamber before growing the ceramic powder.

The method may further include: grading the formed balls into ball groups according to size, and growing the ceramic balls to a desired size, with the ball groups placed in separate rotary chambers.

The growing ceramic powder comprises repeating temporal temperature elevation before supplying the materials into the chamber.

An inner surface of the rotary chamber may be subjected to roughening treatment when growing the ceramic powder.

In accordance with another aspect of the present invention, an apparatus for producing ceramic balls includes: a rotary chamber having an inlet through which ceramic powder is input, and a nozzle through which water and/or a binder is/are sprayed; and a tilt adjuster adjusting a tilt angle of a rotary axis of the rotary chamber. Here, the rotary chamber has a polygonal inner wall subjected to roughening treatment.

The apparatus may further include a heater which heats the interior of the rotary chamber.

The apparatus may further include a screen sieve detachably mounted to the inlet of the rotary chamber to grade the formed balls according to size.

Advantageous Effects

According to embodiments of the present invention, ceramic powder is formed into ceramic balls through a rotation method, so that mass production is possible and substantially truly spherical ceramic balls can be obtained. Further, formation of the ceramic balls is facilitated by introduction of seeds in a formation process using rotation and ceramic balls having a similar size may be obtained within a short period of time. Further, the ceramic balls are graded according to size in the course of the formation process, thereby providing uniform particle size distribution, and the ceramic balls are temporarily heated before introduction of materials into the rotary chamber, so that the ceramic balls are prevented from being split at a boundary between shells, thereby improving strength of the ceramic balls.

In the apparatus according to one embodiment, the inner wall of the rotary chamber has a polygon shape and is subjected to roughening treatment, so that ceramic powder is prevented from adhering to the inner wall and ceramic balls have improved strengthen. Further, a screen sieve is detachably mounted to the inlet of the rotary chamber, thereby facilitating grading of ceramic balls according to size.

DESCRIPTION OF DRAWINGS

The above and other aspects, features and advantages of the present invention will be more clearly understood from the following detailed description of embodiments taken in conjunction with the accompanying drawings, in which.

BRIEF DESCRIPTION OF MAJOR PARTS IN THE DRAWINGS

| 100: Rotary Chamber |
| 110: Inlet |
| 120: Inner Wall |
| 130: Spray Nozzle |
| 200: Tilt Adjuster |
| 300: Motor |
| 400: Heater |
| 500: Dust Suction Port |
| 600: Screen Sieve |

Best Mode

Exemplary embodiments of the present invention will now be described in more detail with reference to the accompanying drawings.

Figure 1:
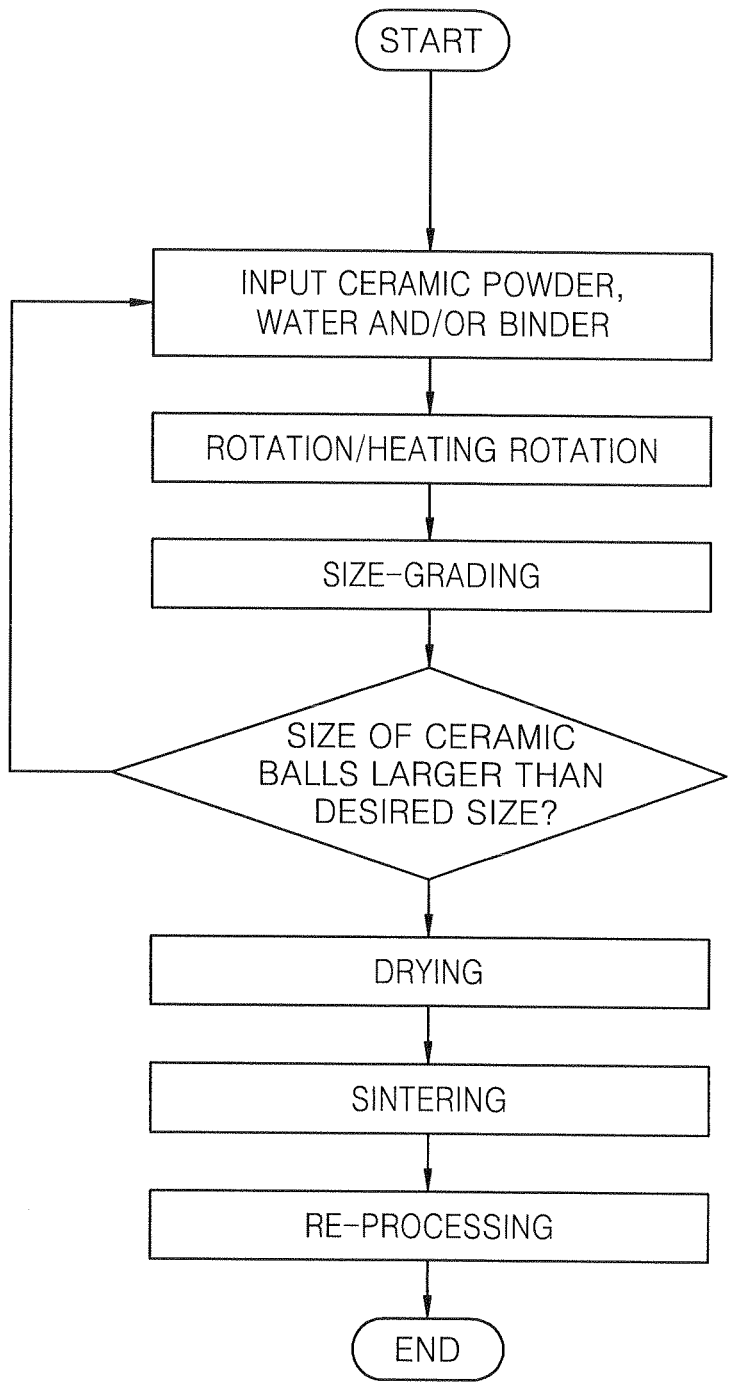
FIGS. 1 to 3 are flowcharts of a production method in accordance with one exemplary embodiment of the present invention.
Figure 2:
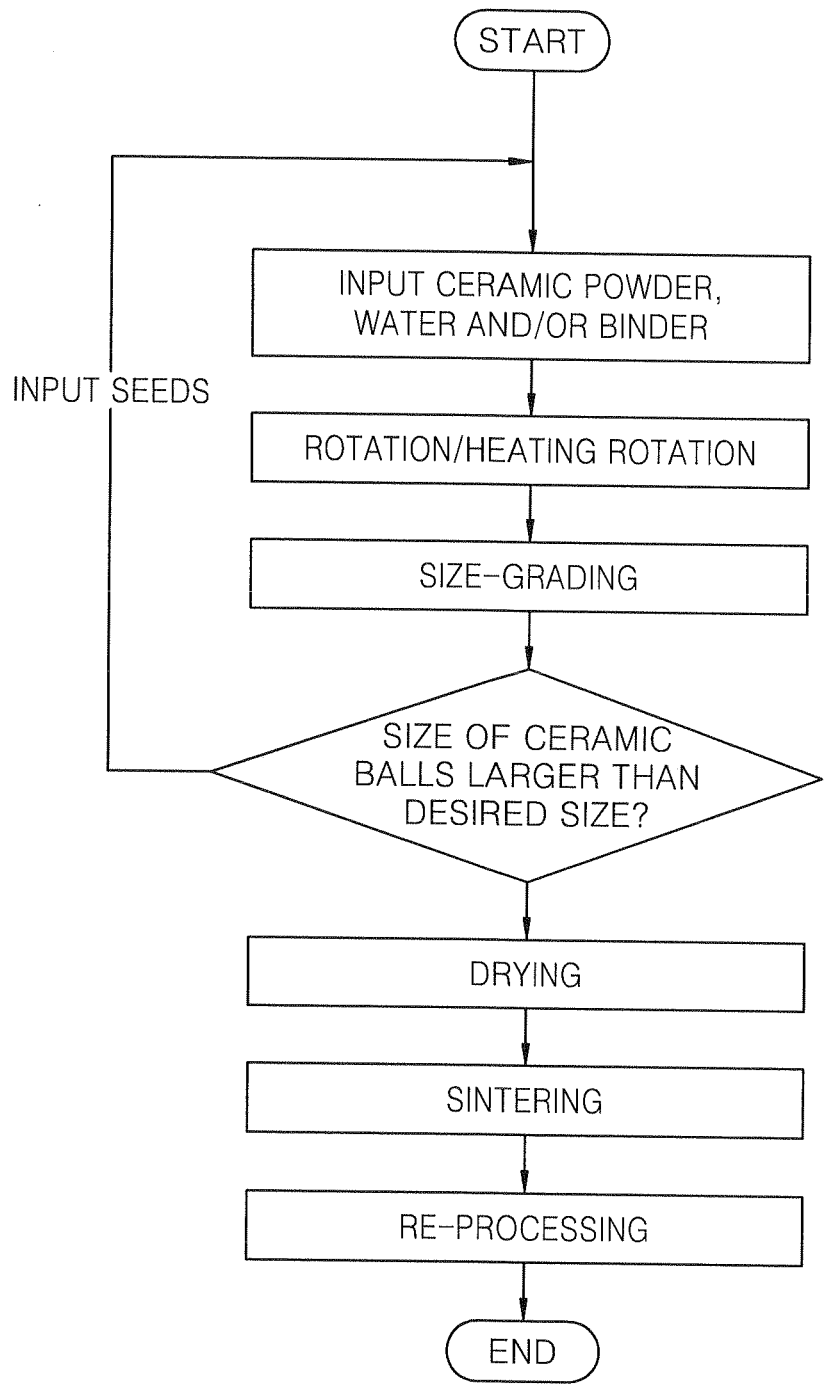
Figure 3:
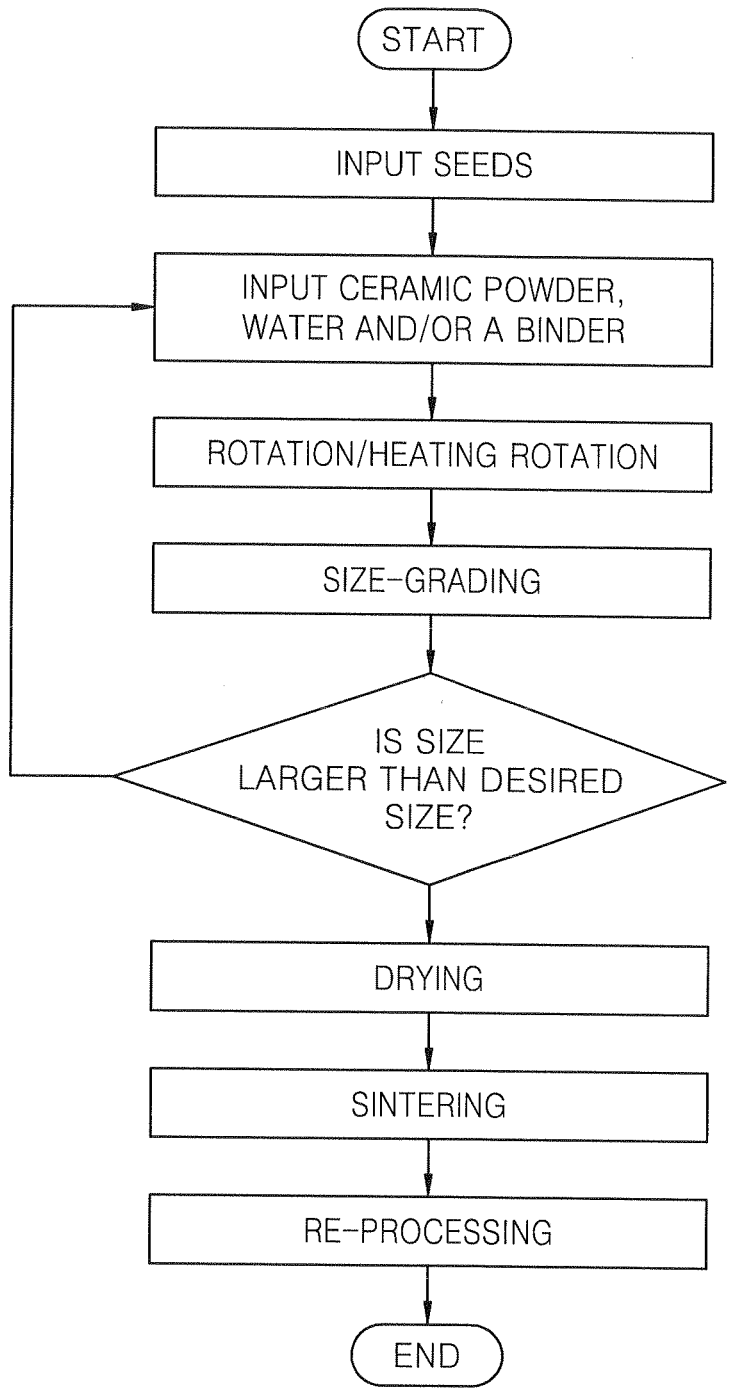
Figure 4:
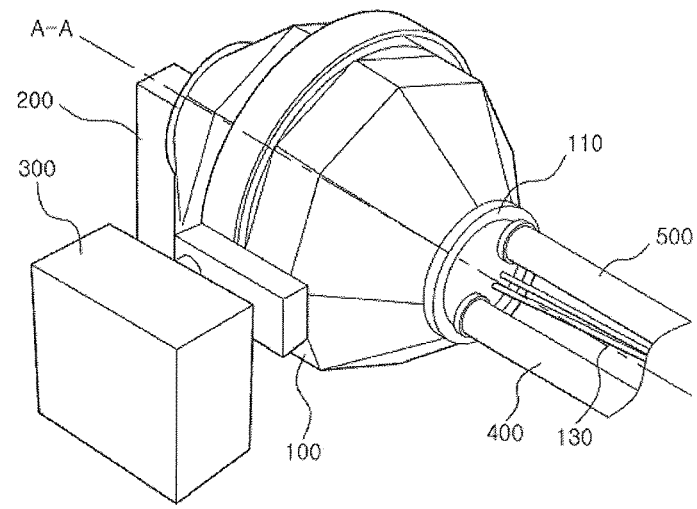
FIG. 4 is a perspective view of a fabrication apparatus in accordance with one exemplary embodiment of the present invention.
Figure 5:
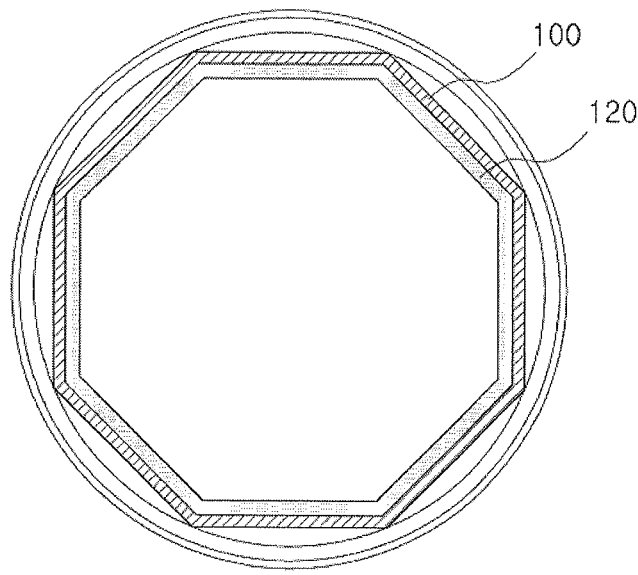
FIG. 5 is a cross-sectional view of the fabrication apparatus of FIG. 4.
Figure 6:
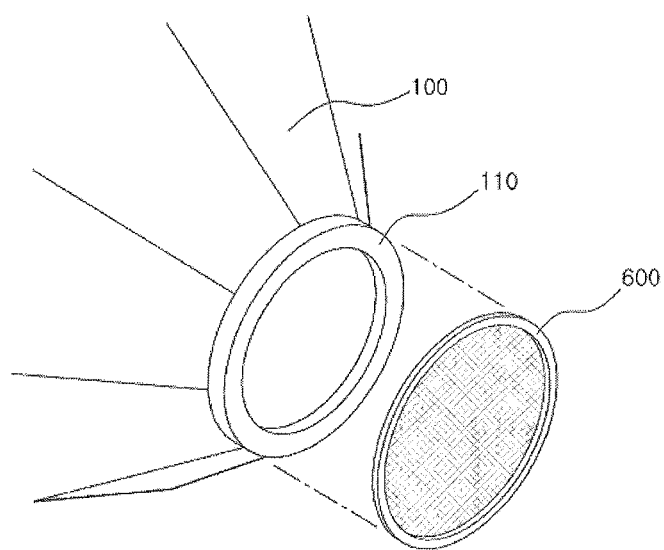
FIG. 6 is a view of a screen sieve detached from the fabrication apparatus of FIG. 4.

FIGS. 1 to 3 are flowcharts a production method according to one exemplary embodiment of the present invention, and FIGS. 4 to 6 are views of a fabrication apparatus according to one exemplary embodiment of the present invention.

The method of producing ceramic balls using a rotation manner according to the exemplary embodiment includes the following processes:

(a) a formation process of growing ceramic powder to balls having a desired size by rotating a rotary chamber while supplying materials including the ceramic powder, water and/or a binder into the rotary chamber;

(b) a drying process of drying the formed balls; and (c) a sintering process of sintering the dried balls at high temperature.

In this method, the rotary chamber is rotated with ceramic powder first introduced into the rotary chamber, and then water and/or a binder is/are sprayed into the rotary chamber. Water and/or the binder agglomerate the ceramic powder, and the agglomerated ceramic powder gradually increases in size, forming a spherical shape. The materials may be input to the rotary chamber by uniformly or arbitrarily dividing the total amount and inputting the divided amount using, but not limited to, an intermittent or multi-stage introduction manner.

In order to rotate the materials including the ceramic powder, water and/or binder, etc, as shown in FIG. 4, the rotary chamber 100, the entirety of which is rotated about a rotary axis A-A, may be used. However, the present invention is not limited thereto, but may adopt various methods to rotate the materials, such as a method of rotating only the bottom of the chamber, a method of rotating a propeller in the chamber, a method of forwardly or reversely rotating the entirety or the bottom of the chamber while rotating the propeller, and the like.

The ceramic powder as a source material of a ceramic ball may be at least one material selected from the group consisting of, without being limited to, ceramic, metallic materials, organic materials, and mixtures thereof, such as ceramics, clay, kaoline, zeolite, diatomite, loess, elvan, coal, calcium oxide, feldspar, porcellanite, illite, tourmaline, zircon titania, silica, alumina, monazite, negative ionic ceramic, silver, gold, platinum, ruthenium, zinc, ruthenium-zinc, calcium, magnesium, coral, antiseptic agent, etc.

Water introduced into the ceramic powder may be a solution commonly used in the art, such as tap water, purified water, well water, drinking water, liquid containing silver or platinum, and the like, without being limited thereto.

The binder may be a binder material commonly used in the art, such as an organic binder, inorganic binder, or a combination thereof, including, for example, acrylic binder, silica binder, PE binder, or cement binder, without being limited thereto.

The ceramic balls fabricated by the embodiment of the invention may include bio balls, far infrared balls, tourmaline balls, chloride-free balls, elvan balls, illite balls, coal balls, carbon balls, loess balls, zeolite balls, dehumidifying balls, antiseptic balls, water-purifying balls, matt balls, pillow balls, cushion balls, foot-massage balls, Pi-water balls, alumina balls, zirconia balls, negative ionic balls, sterilizing balls, magnet balls, photocatalyst balls, water treatment balls, shower balls, washing balls, bidet balls, alkaline balls, antioxidant balls, taste balls, ionic balls, soft water balls, etc., according to material and use thereof.

The composition of the materials input for producing ceramic balls may be varied as needed. If the viscosity of the ceramic powder is high as in loess balls, the powder may be formed using water without a separate binder, whereas when producing low viscosity chloride balls, a binder is added to the powder. It should be noted that the materials input to the chamber are not limited to a specific kind or amount, and that new ceramic powder or water and/or binder may be manually or automatically supplied into the chamber in the course of the formation process according to viscosity of the powder material.

The rotation speed of the input material may be varied as needed. According to a target ball, the composition of ceramic powder and the kinds and amount of water and/or binder may vary. Accordingly, the degree of agglomeration of the ceramic powder in the rotary chamber 100 and the degree of adhesion of the ceramic powder to an inner wall 120 of the rotary chamber vary, so that there is a need to control the rotation speed. Generally, since the strength of the balls increases with increasing rotational speed, the rotary chamber is rotated at low RPM at the beginning of ball-formation and is then rotated at high RPM as the size of the balls increases.

An angle of the rotary axis A-A of the rotary chamber may also be arbitrarily controlled such that, at the beginning of formation, the angle of the rotary axis A-A relative to the ground is increased to improve contact frequency between powdery particles, and at the final stage of the formation, the rotary chamber is rotated at a relatively small tilt angle. Even in the case where the powder severely adhere to the inner wall 120 of the rotary chamber or the powder is severely agglomerated in the course of the formation process, the angle of the rotary axis A-A is adjusted to ensure a smooth formation process, as needed.

The size of the formed spherical ceramic balls has various diameters ranging, but not limited to, from 0.5 to 100 mm. Generally, the diameter ranges from 1 to 50 mm. When using the rotation method according to the present invention, a precise spherical ceramic ball may be formed with a tolerance of ±1 mm.

After the ceramic balls having a desired size and strength are formed, the balls are subjected to drying and sintering to form complete ceramic balls. Temperature and time for drying and sintering may vary according to the kind of ceramic balls. Specifically, the drying may be carried out at a temperature of 80 to 200° C. for 5 to 20 hours, and sintering at a temperature of 900 to 1300° C. for 10 to 20 hours. If particularly high strength is required, coating and strength-reinforcing may be carried out. According to the kinds of ceramic balls, desired ceramic balls may also be obtained through the formation process and drying process.

In a production method according to another exemplary embodiment, seeds to which ceramic powders adhere are first introduced into the rotary chamber before the formation process.

If only ceramic powder is input from the beginning, time for agglomerating the ceramic powder is prolonged, so that particle size distribution of the ceramic balls becomes wider, thereby deteriorating fabrication efficiency. Thus, when the seeds, that is, small particles, to which the ceramic powder is likely to adhere, are first introduced into the rotary chamber before the formation process, the ceramic powder adheres to the seeds, thereby enabling rapid fabrication of truly spherical ceramic balls. For example, if only ceramic powder is input to fabricate 5 mm ceramic balls, only approximately 50% of the total weight is finally obtained, whereas if 2 mm seeds are used, 5 mm ceramic balls of more than 80% of the total weight can be obtained, thereby considerably improving productivity.

Meanwhile, while the kind of available seeds is not restricted to a specific kind, the seeds may be any material such as ceramic powder. Like the production method of the ceramic balls, the seeds may be fabricated by the formation method using a rotation manner, or other methods.

In a production method according to a further exemplary embodiment, the ceramic balls formed by the formation process are graded into various groups according to size, and the graded groups of ceramic balls are respectively input to separate rotary chambers and the formation process is performed again.

While formation of the ceramic balls using the rotation manner described above is superior to other methods in that ceramic balls are made into truly spherical balls, a problem also arises in that the ceramic balls have a variety of sizes and wide particle size distribution. This can be solved by further grading the ceramic balls according to size, in addition to use of seeds.

For example, when 5 mm ceramic balls are formed, the ceramic material is rotated until the material is formed into 2 mm grains using only ceramic powder or otherwise together with seeds, and then the formation process is temporarily stopped and the formed grains are graded according to size.

Grading may be performed by drawing out ceramic balls and grading them according to size using a separate screen, or otherwise a screen sieve 600 detachably mounted to the rotary chamber according to the embodiment of the invention. In the grading process, the graded grains screened according to size serve as so called the seeds, which are re-input to the rotary chamber and grown to 5 mm in diameter through the formation process.

When the grading process is performed, a plurality of rotary chambers is used in practice. Although only the grains having a desired size may be selectively re-used as seeds, remaining grains may also be used by inputting the remaining grains into separate chambers and subjecting the remaining grains to the formation process to have similar sizes in the respective chamber, so that large amounts of ceramic balls can be fabricated more efficiently. Further, since the grains are input to a new chamber after grading, the grains are less affected by ceramic powder adhered to the inner wall 120 of the existing chamber, thereby making it possible to fabricate true-sphere type ceramic balls more efficiently.

In a production method according to a further exemplary embodiment, the ceramic powder is repeatedly temporarily heated to grow the ceramic powder to a desired size, prior to inputting the materials into the rotary chamber in the formation process.

Once ceramic powder is agglomerated into the grains or seeds, remaining ceramic powder is likely to adhere to the seeds, thereby forming spherical balls having a number of shells, which can be broken or partially split at their boundary due to impact during rotation and by nature of material.

This causes an increase in error of the true sphere shape of a ceramic ball and a decrease in strength. To solve this problem, the present invention proposes a method in which before the materials including the ceramic powder and water and/or the binder are introduced into the rotary chamber, the materials are temporarily heated. Then, if the respective boundaries of the ceramic powdery particles are heated before an additional powder layer is formed, the formed ceramic powder layer is hardened to prevent breakage and split at the boundary, thereby improving strength of the whole ceramic balls. Heating may be performed by, but is not limited to, heating the rotary chamber so as to indirectly heat the ceramic powder, or otherwise blowing hot air directly towards the materials.

FIG. 3 shows a flowchart of the method of producing 5 mm ceramic balls in which a heating process is added. It can be selected whether or not seeds for forming the ceramic balls are input to the rotary chamber. After inputting the seeds, the materials are first input to the chamber, which in turn is rotated, thereby forming 2 mm ceramic balls. Next, hot air is blown to raise the temperature of the chamber to 100° C. while the chamber is rotated and then the materials are cooled. 2 mm or more grains among the formed grains are graded using a screen sieve, and graded grains are input to new chambers (the grading process is optional). Then, materials are secondarily input to the chamber, which in turn is rotated to form 5 mm grains. Next, hot air is blown to heat the formed grains to 100° C., which are then cooled.

As such, breakage of the powder boundaries is prevented and the strength is increased by heating immediately before inputting the materials into the chamber, and the drying process after the formation process is partially performed by heating even after the ceramic balls are formed with desired size, thereby shortening the drying process.

In a production method according to a further exemplary embodiment, the inner wall 120 of the rotary chamber in which materials are rotated is subjected to roughening treatment. In formation of the ceramic powder into the ceramic balls using the rotation manner, it is difficult to prevent a phenomenon wherein powder adheres to the inner wall 120 of the chamber together with the water and/or the binder, etc.

This is very disadvantageous for ceramic powder containing viscous loess in terms of formation efficiency. To solve this problem, according to this embodiment, the inner wall 120 of the chamber is subjected to roughening treatment to prevent the ceramic powder from adhering to the inner wall and to increase friction with respect to the ceramic balls, thereby forming firmer ceramic balls.

If the inner wall of the rotary chamber has low roughness, adhesion of the materials cannot be prevented, and if the roughness is excessively high, clusters of the ceramic powder is likely to break and is prevented from being formed into the ceramic balls. The roughness of the inner wall 120 of the chamber may vary according to viscosity of the materials and the size and strength of ceramic balls to be formed. For example, if 5 mm loess ceramic balls are to be formed, the inner wall 120 may have a surface roughness Ra of 0.3 to 1.2 mm.

In accordance with another aspect, the present invention provides an apparatus for producing ceramic balls using a rotation manner. The apparatus includes a rotary chamber 100 having an inlet 110 through which ceramic powder is input, and a nozzle 130 through which water and/or a binder is/are sprayed, and a tilt adjuster 200 which adjusts a tilt angle of a rotary axis A-A of the rotary chamber 100, wherein the rotary chamber 100 has a polygonal inner wall 120 subjected to roughening treatment.

The rotary chamber 100 may have any shapes such as a cylinder, polygonal cylinder, sphere, etc., so long as they can rotate. The rotary chamber 100 is connected to a motor 300 such that the rotation speed of the rotary chamber is controlled by a controller. Materials including ceramic powder, water, binder, and the like are introduced into the chamber through the inlet 110 and the nozzle 130. The rotary chamber 100 is formed of, but is not limited to, iron, plastic, FRP, stainless steel, or the like.

In the apparatus, the rotary chamber 100 has a polygonal inner surface, which allows ceramic balls to frequently come into contact with the inner surface, thereby forming hardened ceramic balls.

Further, the inner wall 120 of the rotary chamber 100 is subjected to roughening treatment as shown in FIG. 5 to increase friction of the inner wall to other materials, so that the ceramic powder is prevented from adhering to the inner wall 120 of the chamber, thereby improving strength of the ceramic balls. According to one embodiment of the invention, the inner wall may be coated with ceramic, urethane, or cement to provide roughness to the inner wall 120 of the rotary chamber 100. However, the inner wall is not limited to a specific roughening material or roughness.

The rotary chamber 100 is provided with the inlet 110 through which ceramic powder is introduced, and the viscosity, degree of agglomeration, size, or the like of ceramic powder may be observed through the inlet 110 during the formation process. Further, the rotary chamber is provided with the nozzle 130 through which the water and/or the binder are sprayed.

The rotary chamber 100 may be manually tilted. Alternatively, the rotary chamber may be provided with a tilt adjuster 200, which may regulate a tilt angle of the rotary axis A-A to adjust a slope of the chamber.

In one exemplary embodiment, the apparatus may further include a heater 400 which heats the interior of the rotary chamber 100. The heater 400 may operate with direct heating using a heating wire, which is mounted on the rotary chamber 100, or indirect heating by blowing hot air. FIG. 4 shows the indirect heating. A dust suction port 500 may also be provided together with the heater 400. The dust suction port 500 suctions not only dust generated during fabrication, but also inner hot air to a cooling function, thereby heating and cooling the materials together with the heater 400.

In another exemplary embodiment, the apparatus may further include a screen sieve 600 which is detachably mounted to the rotary chamber 100 to grade the formed balls according to size. As set forth above, when the grading process is performed in production of ceramic balls using a rotation manner, good particle size distribution is obtained, thereby accomplishing efficient fabrication.

In the grading process, while the ceramic balls may be drawn out during fabrication and be separately size-graded in a manual or automatic manner, according to the embodiment of the present invention, the screen sieve 600 is detachably mounted to the inlet 110 of the chamber so that the ceramic balls can be size-graded without removal from the chamber.

If size-grading is required during the formation process, the chamber is tilted using the tilt adjuster 200 so that ceramic balls are first size-graded through the screen sieve 600 on the inlet 110. Here, if the chamber is rotated or vibrated, the size-grading becomes more efficient. Further, when the screen sieve 600 has a number of mesh sizes and multiple size-grading is performed, ceramic balls may be efficiently graded into various sizes.

Next, examples of ceramic balls produced by the method and apparatus of the present invention will be described.

Example 1

Ceramic balls were produced using ceramic powder and a binder (PVA) having a composition shown in Table 1.

TABLE 1

| Components | Composition (wt %) |
|---|---|
| Elvan | 20 |
| Sericite | 25 |
| Tourmaline | 10 |
| Calcium oxide antiseptic agent | 20 |
| Feldspar | 10 |
| Titanium dioxide | 2 |
| Clay | 8 |
| PVA | 5 |
| Total weight | 100 |

500 g of ceramic powder (excluding PVA) was placed in a rotary drum, and 5 g of PVA (from Kuraray Co., Ltd.) and 50 g of water, which corresponds to 10% of the total weight of the ceramic powder, were sprayed at 10 m/s towards the ceramic powder through the nozzle 130 while the rotary drum was rotated at 20 rpm with a rotary axis A-A tilted at an angle of 20 degrees to grow ceramic grains to a diameter of 1 mm. 500 g of ceramic powder was input again into the rotary drum, and water and PVA were also sprayed towards the ceramic powder while the rotary drum was rotated at 250 rpm with a rotary axis A-A tilted at an angle of 10 degrees to grow the ceramic grains to a diameter of 5 mm.

Final ceramic balls had particle size distribution shown in Table 2.

TABLE 2

| Diameter | 5 mm or more | 5~3 mm | 3 mm or less |
|---|---|---|---|
| Final wt % | 48% | 31% | 21% |

5 mm or more ceramic balls were dried at 80° C. for 12 hours, followed by sintering at 1100° C. for 15 hours.

Example 2

5 mm ceramic balls were produced using the same materials as in Example 1.

1 mm seeds were placed in the rotary drum together with 500 g of ceramic powder (excluding PVA), and water and PVA were sprayed while the rotary drum was rotated at 250 rpm with the rotary axis A-A tilted at an angle of 10 degrees to grow ceramic grains to a diameter of 5 mm.

Final ceramic balls had particle size distribution shown in Table 3.

TABLE 3

| Diameter | 5 mm or more | 5~3 mm | 3 mm or less |
|---|---|---|---|
| Final wt % | 87% | 9% | 4% |

As can be seen from Table 3, final ceramic balls had excellent particle size distribution.

5 mm or more ceramic balls were dried at 80° C. for 12 hours, followed by sintering at 1100° C. for 15 hours.

Example 3

5 mm ceramic balls were produced using the same material as example 1.

500 g of ceramic powder (excluding PVA) was placed in the rotary drum, and 50 g of water, which corresponds to 10% of the total weight of the ceramic powder, was sprayed at 10 m/s towards the ceramic powder through the nozzle 130 while the rotary drum was rotated at 20 rpm with the rotary axis A-A tilted at an angle of 20 degrees to grow ceramic gains to a diameter of 1 mm.

A 1.5 mm screen sieve 600 was mounted on the rotary drum 100 and 0.5 to 1 mm ceramic balls (seeds) were size-graded. Next, graded seeds were input together with 500 g of ceramic powder, and water was sprayed while the rotary drum was rotated at 250 rpm with the rotary axis A-A tilted at an angle of 10 degrees to grow the ceramic gains to a diameter of 5 mm.

Final ceramic balls had particle size distribution shown in Table 4.

TABLE 4

| Diameter | 5 mm or more | 5~3 mm | 3 mm or less |
|---|---|---|---|
| Final wt % | 81% | 12% | 7% |

As can be seen from Table 4, the final ceramic balls had excellent particle size distribution.

5 mm or more ceramic balls were dried at 80° C. for 12 hours, followed by sintering at 1100° C. for 15 hours.

Example 4

5 mm ceramic balls were produced using the same material as example 1.

500 g of ceramic powder (excluding PVA) was placed in the rotary drum, and 50 g of water was sprayed at 10 m/s through the nozzle 130 while the rotary drum was rotated at 20 rpm with the rotary axis A-A tilted at an angle of 20 degrees to grow ceramic gains to a diameter of 1 mm.

Next, the inner temperature of the rotary drum was elevated to 100° C. by blowing hot air using the heater 400, and was cooled to a certain temperature while the rotary drum was rotated.

500 g of ceramic powder was input again into the rotary drum, and water was sprayed towards the ceramic powder while the rotary drum was rotated at 250 rpm with the rotary axis A-A tilted at an angle of 10 degrees to grow the ceramic gains up to a diameter of 5 mm.

Final ceramic balls have particle size distribution shown in Table 5.

TABLE 5

| Diameter | 5 mm or more | 5~3 mm | 3 mm or less |
|---|---|---|---|
| Final wt % | 80% | 13% | 7% |

As can be seen from Table 5, the final ceramic balls had excellent particle size distribution.

5 mm or more ceramic balls were dried at 80° C. for 12 hours, followed by sintering at 1100° C. for 15 hours.

A result of measuring strength of the ceramic balls and those of Example 1 using a strength tester (product name: universal type material tester) is shown in Table 6.

TABLE 6

|  | Example 1 | Example 4 |
|---|---|---|
| Strength (kgf) | 23.4 | 41.8 |

Strength of the final ceramic balls was considerably improved through heating and cooling.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An apparatus for producing ceramic balls using a rotation manner comprising:
    a rotary chamber having an inlet through which ceramic powder is input, and a nozzle through which water, a binder, or water and a binder are sprayed, wherein a rotational speed of the rotary chamber is increased or decreased according to a size of the ceramic balls to be obtained; and
    a tilt adjuster adjusting a tilt angle of a rotary axis of the rotary chamber, wherein the tilt angle is increased for improving contact frequency between the ceramic powder and adjusted to ensure a smooth formation of the ceramic balls,
    wherein the rotary chamber has a polygonal roughened inner wall, which allows the ceramic balls to frequently come into contact with inner surfaces of the polygonal roughened inner wall, thereby forming hardened ceramic balls, and
    wherein a roughness of the polygonal roughened inner wall is varied according to viscosity of the ceramic powder and the size and strength of the ceramic balls.

2. The apparatus of claim 1, further comprising a screen sieve detachably mounted to the inlet of the rotary chamber to grade the formed balls according to size.

3. The apparatus of claim 1, further comprising a heater which heats an interior of the rotary chamber, wherein the heater is configured so that an inner temperature of the rotary chamber is elevated temporarily to grow the ceramic powder to ceramic balls having a desired size.

4. The apparatus of claim 3, further comprising a screen sieve detachably mounted to the inlet of the rotary chamber to grade the formed balls according to size.

5. The apparatus of claim 1, wherein the polygonal roughened inner wall of the rotary chamber is coated with cement.

6. An apparatus for producing ceramic balls using a rotation manner comprising:
- a rotary chamber having an inlet through which ceramic powder is input, and a nozzle through which water, a binder, or water and a binder are sprayed, wherein a rotational speed of the rotary chamber is increased or decreased according to a size of the ceramic balls to be obtained, wherein the polygonal roughened inner wall of the rotary chamber is coated with cement;
- a tilt adjuster adjusting a tilt angle of a rotary axis of the rotary chamber, wherein the tilt angle is increased for improving contact frequency between the ceramic powder and adjusted to ensure a smooth formation of the ceramic balls;
- a screen sieve detachably mounted to the inlet of the rotary chamber to grade the formed balls according to size; and
- a heater which heats an interior of the rotary chamber, wherein the heater is configured so that an inner temperature of the rotary chamber is elevated temporarily to grow the ceramic powder to ceramic balls having a desired size,
- wherein the rotary chamber has a polygonal roughened inner wall, which allows the ceramic balls to frequently come into contact with inner surfaces of the polygonal roughened inner wall, thereby forming hardened ceramic balls,
- wherein a roughness of the polygonal roughened inner wall is varied according to viscosity of the ceramic powder and the size and strength of the ceramic balls,
- wherein the inlet of the rotary chamber is configured for supplying seeds for adherence of the ceramic powder into the rotary chamber, and
- wherein the rotary chamber and the heater are configured for sintering the dried balls at a temperature higher than a predetermined value.

7. An apparatus for producing ceramic balls using a rotation manner comprising:
- a rotary chamber having an inlet through which ceramic powder is input, and a nozzle through which water, a binder, or water and a binder are sprayed, wherein a rotational speed of the rotary chamber is increased or decreased according to a size of the ceramic balls to be obtained, wherein the rotary chamber is configured for growing and forming a plurality of ceramic balls having a desired size with ceramic powder by rotating a rotary chamber while supplying materials including the ceramic powder, water and/or a binder into the rotary chamber, wherein the polygonal roughened inner wall of the rotary chamber is coated with cement;
- a tilt adjuster adjusting a tilt angle of a rotary axis of the rotary chamber, wherein the tilt angle is increased for improving contact frequency between the ceramic powder and adjusted to ensure a smooth formation of the ceramic balls;
- a screen sieve detachably mounted to the inlet of the rotary chamber to grade the formed balls according to size; and
- a heater which heats an interior of the rotary chamber,
- wherein the rotary chamber has a polygonal roughened inner wall, which allows the ceramic balls to frequently come into contact with inner surfaces of the polygonal roughened inner wall, thereby forming hardened ceramic balls.

8. The apparatus of claim 7, wherein the rotary chamber is further configured for drying the formed balls.

9. The apparatus of claim 8, wherein the rotary chamber is further configured for sintering the dried balls at a temperature higher than a predetermined value, wherein an inner surface of the rotary chamber is rough.

10. The apparatus of claim 8, wherein the rotary chamber is further configured for grading the formed balls into ball groups according to size, and growing and forming the ceramic balls of the ball groups to the desired size in separate rotary chambers.

11. The apparatus of claim 10, wherein the rotary chamber is further configured for supplying seeds for adherence of the ceramic powder into the rotary chamber before the step for growing and forming.

12. The apparatus of claim 11, wherein the heater is configured so that an inner temperature of the rotary chamber is elevated temporarily to grow the ceramic powder to ceramic balls having a desired size.

* * * * *